United States Patent [19]

Wallace

[11] 4,238,709
[45] Dec. 9, 1980

[54] HEAD LAMP CONTROL CIRCUIT

[76] Inventor: John M. Wallace, 42 S. Prado, NE., Atlanta, Ga. 30309

[21] Appl. No.: 922,059

[22] Filed: Jul. 5, 1978

[51] Int. Cl.³ .................. H05B 37/02; F21L 15/14
[52] U.S. Cl. ................... 315/291; 307/265; 315/208; 315/209 R; 331/108 D; 362/106; 362/157; 362/295; 362/296
[58] Field of Search .......... 307/253, 247 R, 265; 362/106, 157, 295, 296, 103, 105, 260, 264, 265; 315/208, 209 R, 224, 287, 291, 311, DIG. 4; 331/108 C, 108 D; 357/81; 313/45

[56] References Cited
U.S. PATENT DOCUMENTS

| 3,431,464 | 3/1969 | Brischnik | 315/151 |
| 3,800,136 | 3/1974 | Edelson | 362/157 |
| 3,821,600 | 6/1974 | Wesner | 307/265 X |

OTHER PUBLICATIONS

Dean et al., *Astable and Monostable Oscillators using Integrated Circuits*, RCA Application Note ICAN-6267, Mar. 1971, pp. 353-360.
*Low Speed Astable Uses C.M.O.S.*, Electronic Engineering, Dec. 1973, p. 13.

*Primary Examiner*—Eugene R. LaRoche
*Attorney, Agent, or Firm*—B. J. Powell

[57] ABSTRACT

A battery powered variable intensity hat mounted head lamp with a lamp shell mounting a lens and reflector assembly including an oscillator switching a power transistor mounted on the lamp shell for heat dissipation to control the lamp bulb, a printed circuit board in the lamp shell mounting the lamp bulb and the oscillator components, and a potentiometer mounted on the lamp shell for simultaneously varying both the on time and the off time in the duty cycle of the oscillator.

5 Claims, 4 Drawing Figures

HEAD LAMP CONTROL CIRCUIT

BACKGROUND OF THE INVENTION

1. Field of the Invention

This invention relates generally to light control circuits and more particularly to a lightweight light which can be mounted on a hat and a control circuit therefor which selectively controls the intensity of the light.

2. Description of the Prior Art

Lightweight battery powered lights have found many uses and are quite common. Some of these uses, however, require that the light maximize battery life to give an added measure of protection to the user. One such use is spelunking where helmet mounted head lamps are frequently used. It is crucial that battery life be extended as much as possible in spelunking since the availability of a light can become a life or death matter for the spelunker and since only a limited battery weight can be carried by the spelunker. In spelunking, the required level of intensity of the illumination provided by the head lamp varies widely since only minimal illumination is required to negotiate small passages whereas a bright light is required to probe heights and distances in large rooms and dome pits. Because of this wide range of intensity requirements, head lamps used for spelunking should have the capability of a wide range of intensities to satisfy the viewing requirements of the spelunker while at the same time minimizing power drain on the battery.

Numerous controls are available to selectively vary the illumination intensity of a lamp. Most of these controls are not concerned with battery life and thus impose significant power drain on the battery just to drive the control circuit to vary the illumination intensity of the light. These prior art control circuits also frequently reduced the voltage available to the light. Examples of such prior art control circuits are found in U.S. Pat. Nos. 3,800,136 and 3,821,600. As a result of these limitations, such prior art control circuits have not found applications in head lamps of the type normally used in spelunking.

SUMMARY OF THE INVENTION

These and other problems and disadvantages associated with the prior art are overcome by the invention disclosed herein by providing a control circuit for a lightweight battery powered light of the type used in spelunking which has the capability of controlling the illumination intensity of the light while at the same time minimizing the power drain on the battery powering the light. Further, the control circuit is incorporated directly into a head lamp thereby freeing the wearer from having to carry additional equipment and further is extremely light in weight so that the addition of the control circuit to the headlamp does not adversely affect its use.

The apparatus of the invention is incorporated directly into a lightweight portable light which has a thin hollow metal lamp shell whose front is closed by a lens and reflector assembly. The lamp bulb is mounted on a lamp mounting member carried in the bulb receiving chamber in the lamp shell. A switching transistor is mounted directly onto the outside of the lamp shell so that the lamp shell serves as a heat conductor to conduct the heat away from the transistor. The switching transistor, and thus the lamp bulb, is controlled by an astable oscillator control circuit which has a pair of inverting elements connected in an oscillator configuration. The duty cycle of the astable oscillator is controlled by potentiometer which has its movable contact selectively shunted through a pair of diodes so that as the on time portion of the duty cycle is increased, the off time portion of the duty cycle is correspondingly decreased and vice versa. By using an astable oscillator made up of solid state components the power drain on the battery is reduced to a minimum. Further, by using the solid state components, the astable oscillator is sufficiently lightweight to be incorporated directly in the lamp shell on the lamp mounting member without appreciably affecting the weight of the light. The potentiometer is also directly mounted on the lamp shell and has an operating member projecting through the lamp shell so as to be manually adjusted externally of the lamp shell to adjust the duty cycle of the astable oscillator.

These and other features and advantages of the invention will become more clearly understood upon consideration of the following specification and accompanying drawings wherein like characters of reference designate corresponding parts throughout the several views and in which:

These figures and the following detail description disclose specific embodiments of the invention; however, the inventive concept is not limited thereto since it may be embodied in other forms.

DETAILED DESCRIPTION OF ILLUSTRATIVE EMBODIMENTS

Figure 1:
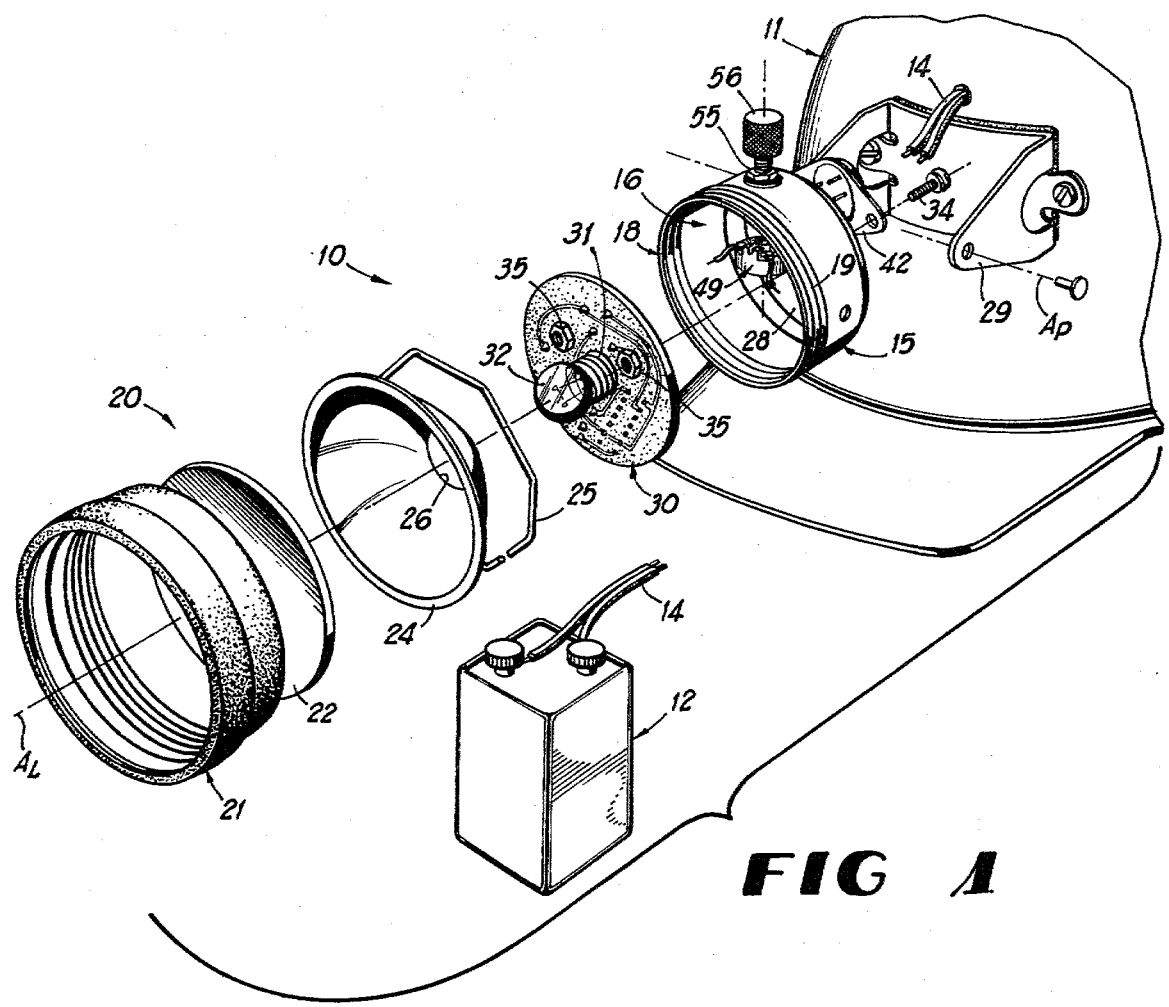
FIG. 1 is an exploded perspective view illustrating the invention.
Figures 3, 4:
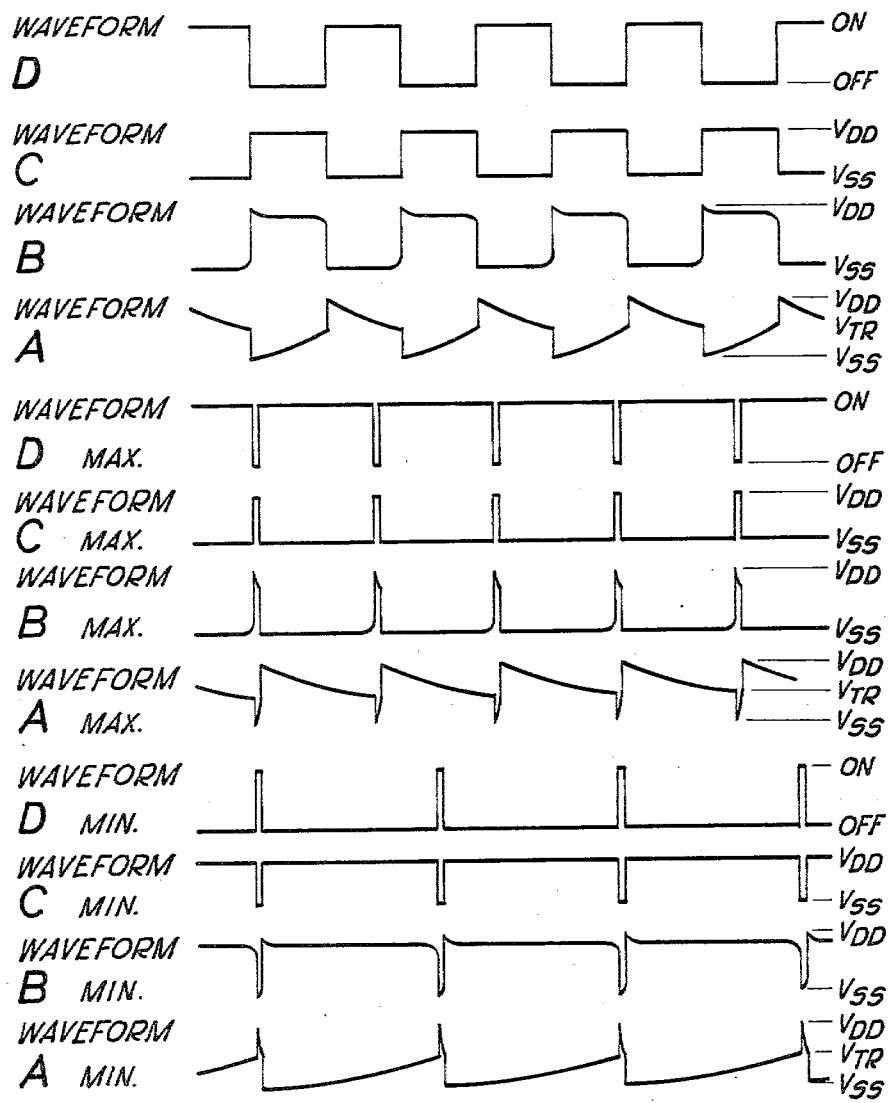
FIG. 3 is an enlarged cross sectional view of the invention seen in FIG. 1.
FIG. 4 is a series of voltage waveforms illustrating the operation of the control circuit of FIG. 2.

Referring to FIGS. 1 and 3, it will be seen that the invention is embodied in a head lamp assembly 10 of the type used in spelunking which is mounted on a protective helmet 11 so that the wearer's hands are free. The head lamp assembly 10 is normally powered by a battery pack 12 usually carried in an appropriate harness on the wearer's belt. The power cable 14 connects the battery pack 12 to the head lamp assembly 10 to power same.

The head lamp assembly 10 includes generally a thin hollow metal lamp shell 15 which defines a bulb receiving chamber 16 therein. The lamp shell 15 further defines a front circular opening 18 to the bulb receiving chamber 16. The lamp shell 15 is usually provided with external threads 19 around the front circular opening 18 to threadedly receive a lens and reflector assembly 20 with a lens cap 21 that is internally threaded to be screwed onto the external threads 19, a lens 22, a reflector 24 and a retainer 25 which holds the lens and the reflector in the lens cap 21 so that the lens and reflector are held in position as the lens cap 21 is screwed onto the external threads on the lamp shell 15. Because the reflector 24 is mounted on the lens cap 21, it will be seen that screwing the lens cap 21 onto and off of the external threads 19 on the lamp shell 15 will also serve to focus the light as will become more apparent. The reflector 24 defines a bulb opening 26 in the rear end thereof to fit over the bulb as will become more apparent. The lamp shell 15 has a generally cylindrical shape concentric about the light axis $A_L$ and defines a flat circular mounting section 28 at the rear end thereof generally normal to the light axis $A_L$ and parallel to the plane of the front circular opening 18 in the shell 15.

The lamp assembly also usually includes a helmet mounting bracket 29 which is adapted to be mounted on the exterior of the protective helmet 11 and which pivotally mounts the lamp shell 15 thereon about a pivot axis $A_P$ oriented generally diametrically of the front circular opening 18 so that the lamp shell 15, and thus the head lamp assembly 10, can be adjusted to direct the light therefrom in the appropriate direction for the wearer to see.

The head lamp assembly 10 further includes a bulb mounting plate 30 illustrated as circular in shape and with the size so that it can be mounted just forwardly of the flat circular mounting section 28 at the rear end of the lamp shell 15. The bulb mounting plate 30 is mounted in the bulb receiving chamber 16 behind the reflector 24 when the lens and reflector assembly 20 is in place. The bulb mounting plate 30 mounts a bulb socket 31 thereon coaxially along the light axis $A_L$ which extends through the head lamp assembly 10 and intersects the pivot axis $A_P$. A lamp bulb 32 is carried in the bulb socket 31 so that when the lens and reflector assembly 20 is screwed onto the lamp shell 15, the lamp bulb 32 will project through the bulb opening 26 in the reflector 24 since the reflector 24 is also coaxially aligned along the light axis $A_L$. The diameter of the bulb opening 26 is slightly larger than the diameter of the lamp bulb 32 so that the reflector 24 will freely pass thereover. The bulb mounting plate 30 is mounted in the bulb receiving chamber 16 by a pair of mounting screws 34 which extend through the flat mounting section 28 on the shell 15 as best seen in FIG. 3 which are provided with appropriate nuts 35 to position the mounting plate 30 so that it is coplanar with the plane of the front circular opening 18 in the lamp shell 15. The nuts 35 further permit the bulb mounting plate 30 to be axially shifted along the light axis $A_L$ to provide a rough focusing of the lamb bulb 32 in the reflector 24. The final focusing of the lamp bulb 32 in the reflector 24 is provided by appropriately screwing the lens and reflector assembly 20 on the external threads 19 of the lamp shell 15. The lamp shell 15 and the bulb mounting plate 30 also serve to mount the lamp control circuit 40.

Figure 2:
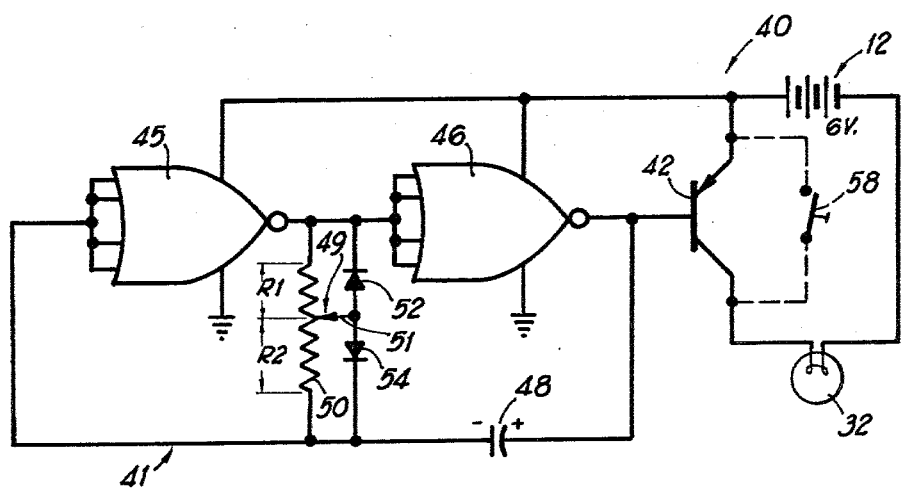
FIG. 2 is an electrical schematic diagram of the control circuit of the invention.

The lamp control circuit 40 will best be understood by reference to FIG. 2 showing the electrical schematic thereof. As seen in FIG. 2, the control circuit 40 includes an astable oscillator 41 which controls a switching power transistor 42. The switching power transistor 42 is connected to the lamp bulb 32 and the battery pack 12 to selectively operate the lamp bulb 32 as will become more apparent.

The astable oscillator 41 includes a first solid state inverting element 45 here shown as a NOR gate with its inputs connected to each other and a second solid state inverting element 46 whose input is connected to the output of the first inverting element 45. The second inverting element 46 is shown as a NOR gate with all its inputs connected to the output of the first inverting element 45. A capacitor 48 is connected between the output of the second inverting element 46 and the input of the first inverting element 45. Potentiometer 49 has its fixed resistance 50 connecting the common point between the capacitor 48 and the input of the first inverting element 45 with the common point between the output of the first inverting element 45 and the input of the second inverting element 46. The movable contact 51 of the potentiometer 49 is connected to the common point between the output of the first inverting element 45 and the input of the second inverting element 46 through a diode 52 which permits current to flow from the movable contact 51 to the common point between the output of the first inverting element 45 and the input of the second inverting element 46. The movable contact 51 is also connected to the common point between the capacitor 48 and the input of the first inverting element 45 through a diode 54 oriented so that the current can flow from the movable contact 51 to the common point between the capacitor 48 and the input of the first inverting element 45. Both of the inverting elements 45 and 46 are powered from the battery pack 12 and the output of the second inverting element 46 is connected to the base of the power transistor 42. The power transistor 42 is illustrated as a PNP transistor with its emitter connected to the positive side of the battery pack 12 and its collector connected to the negative side of the battery pack 12 through the lamp bulb 32. Thus, it will be seen that, when the output of the second inverting element 46 is low, the transistor 42 will conduct to cause the lamp to be illuminated, while the transistor 42 will not conduct when the output of the second inverting element 46 is high.

The inverting elements 45 and 46 are available in chip form as a single package to facilitate the mounting thereof. The inverting elements 45 and 46 may be inverters or gates wired as inverters with the gates usually being NOR gates or NAND gates. Very low power drain on the battery pack 12 to drive the oscillator will be achieved where the inverting elements 45 and 46 are complementary symmetry metal-oxide semiconductor integrated circuits (COS/MOS).

Referring now to FIGS. 1 and 3, it will be seen that the control circuit 40 can be most advantageously mounted in the lamp assembly 10 by using a printed circuit board as the bulb mounting plate 30. Thus, the PC board plate 30 has the appropriate printed circuit formed therein to mount the inverters 45 and 46 as well as the capacitor 48 and the diodes 52 and 54. This allows the PC board plate 30 to be mounted on the screws 34 with the nuts 35 and carry the circuit components thereon behind the plate 30 and just forward of the flat section 28 on the lamp shell 15.

The transistor 42 has a flange type mounting and is mounted on the outside of the flat mounting section 28 of the lamp shell 15. Thermal contact is provided between the lamp shell 15 and the transistor 42 so that heat generated by the transistor 42 is quickly dissipated through the large surface of the shell 15. Appropriate holes are provided through the flat mounting section for the connections to the transistor 42 to extend. These connections align with the points in the printed circuit on the PC board plate 30 so that the transistor 42 can be properly connected in the printed circuit on board 30.

A hole is provided through the top of the lamp shell 15 through which the control shaft of potentiometer 49 protrudes outside of shell 15. Nuts 55 hold the potentiometer 49 in place within the bulb receiving chamber 16 forwardly of the PC board plate 30 and behind the reflector 24. A manual control knob 56 is mounted on the outboard end of the potentiometer control shaft outside shell 15 so that the wearer can easily manually adjust the setting of the movable contact 51 of potentiometer 49. The fixed resistance 50 and the movable contact 51 are connected to the appropriate points on the printed circuit on the PC board plate 30.

The power cable 14 is extended out through a hole in the helmet 11 behind head lamp assembly 10 and then into the bulb receiving chamber 16 through an appropriate hole in the flat mounting section 28 of the lamp shell 15 for attachment to the appropriate points in the printed circuit on the PC board plate 30. This construction is extremely lightweight and compact, and thus permits the control circuit 40 to be incorporated into the head lamp assembly 10.

For safety's sake, the lamp bulb 32 may be connected directly to the battery pack 12 by shorting out the switching transistor 42 in case the circuit 40 fails. To facilitate this operation, a shorting switch 58 may be connected across the transistor 42 as seen by dashed lines in FIG. 2 so that, when switch 58 is closed, the battery pack 12 will be connected directly to the lamp bulb 32. An appropriate switch mechanism may likewise disconnect the circuit 40 from the battery pack 12.

OPERATION

Operation of the invention will best be understood by reference to FIGS. 2 and 4 of the drawings. First of all, it will be noted that the fixed resistance 50 of the potentiometer 49 has two resistance portions R1 and R2 associated with the movable contact 51 with each of these resistance portions R1 and R2 varying in value as the movable contact 51 is moved over the fixed resistance 50. For sake of clarity, the waveforms illustrated in FIG. 4 have been related to their respective points in the circuit of FIG. 2 by the reference numerals A-D. It will be noted that, when the voltage at point B is high, the voltage at point C will be low and vice versa.

For sake of explanation, if we assume that the voltage at point B is high and the voltage at point C is low, it will be seen that the capacitor 48 is charged in the indicated polarity seen in FIG. 2. Now, with point C low and point B high, the capacitor 48 charges toward the opposite polarity through the path from point B through the resistance portion R1 of the fixed resistance 50, the movable contact 51 and the diode 54 with an exponential time constant predominantly determined by resistance portion R1 and the value of the capacitor 48. It will further be appreciated that the charge on that end of the capacitor 48 connected to the input of the first inverting element 45 is the voltage at point A. When the voltage at point A reaches the transfer voltage $V_{TR}$ seen in waveform A in FIG. 4, the output of the inverting element 45 changes state so that the voltage at point B goes low which in turn causes the voltage at point C, the output of the inverting element 46, to go high. This causes the charging current on the capacitor 48 to reverse so that the capacitor 48 now discharges through the resistance portion R2 of the fixed resistance 50, the movable contact 51 and the diode 52 with a time constant determined predominantly by the value of the capacitor 48 and the resistance portion R2. When the capacitor 48 has discharged down to the point where the transfer voltage $V_{TR}$ is imposed at point A, the inverting element 45 changes state so that its output voltage at point D again goes high which in turn causes the output of the inverting element 46 at point C to go low so that the astable oscillator 41 has returned to the starting state indicated. This process is then repeated. It will further be appreciated that since the resistance portions R1 and R2 of the fixed resistance 50 and the potentiometer 49 both change as movable contact 51 is shifted, the duty cycle at point C will vary both in its high state and its low state each time the movable contact 51 is moved. Because of the fixed internal resistance of the other elements in the charging path and discharging path of the capacitor 48, it will be seen that shifting the movable contact 51 on the potentiometer 49 also varies the frequency output at point C. For purposes of this application, the frequency variation is largely incidental and has no adverse affect on the operation of the lamp control circuit 40.

It will also be noted that because the power transistor 42 is turned on each time the voltage at point C goes low and is turned off each time the voltage at point C goes high, the waveform D illustrated in FIG. 4 will be generated at point D in FIG. 2. The waveforms labelled A-D illustrate the circuit in FIG. 2 operating on about a 50% duty cycle. Those waveforms in FIG. 4 labelled $A_{max.}-D_{max.}$ in FIG. 4 illustrate the circuit operating at maximum on time for the lamp bulb 32, and those waveforms in FIG. 4 labelled $A_{min.}-D_{min.}$ in FIG. 4 illustrate the circuit of FIG. 2 operating with a minimum on time for the lamp bulb 32. The lamp bulb 32 is an incandescent type lamp bulb and should be a lamp bulb which draws the minimum current when illuminated such as a No. 502 lamp bulb (150 mA/5V). Because the lamp bulb 32 is an incandescent lamp bulb, the lamp bulb 32 is effectively on 100% of the time when the control circuit 40 is set at its maximum, and is effectively off 100% of the time when the control circuit 40 is set at the minimum.

I claim:
1. A lightweight portable light including:
a thin hollow metal lamp shell defining a bulb receiving chamber therein and a front opening to said bulb receiving chamber at the front of said lamp shell;
a lens and reflector assembly selectively closing said front opening to said lamp shell;
a lamp mounting member mounted in said bulb receiving chamber in said lamp shell behind said lens and reflector assembly;
a lamp bulb mounted on said lamp mounting member and oriented so that said lamp bulb is operatively associated with said lens and reflector assembly when said lens and reflector assembly selectively closes said front opening in said lamp shell; and
a switching transistor mounted on said lamp shell in thermally conducting contact therewith so that said lamp shell acts as a heat sink to dissipate heat from said switching transistor to keep said switching transistor cool, said switching transistor selectively controlling the illumination of said lamp bulb.

2. The light of claim 1 wherein said lamp mounting member is a printed circuit board defining a printed circuit thereon and further including a multi-component control circuit for controlling said switching transistor, at least some of the components of said control circuit mounted on said lamp mounting member and operatively connected to the printed circuit thereon, and said switching transistor operatively connected to the printed circuit on said lamp mounting member.

3. The light of claim 1 further including adjustable mounting means mounting said lamp mounting member on said lamp shell for adjustably moving said lamp mounting member and thus said light bulb with respect to said lens and reflector assembly to focus same.

4. The light of claim 1 wherein said lamp mounting member is a printed circuit board defining a printed circuit thereon and further including an astable oscillator comprising:

a first inverting element having an input and an output mounted on said lamp mounting member and connected to the printed circuit thereon;

a second inverting element having an input and an output mounted on said lamp mounting member and connected to the printed circuit thereon, the printed circuit connecting the output of said first inverting element directly to the input of said second inverting element, and the output of said second inverting element directly to the base of said switching transistor;

a capacitor mounted on said lamp mounting member and connected to the printed circuit thereon, the printed circuit connecting said capacitor between the output of said second inverting element and the input of said first inverting element;

a potentiometer having a fixed resistance and a movable contact selectively manually settable along said fixed resistance mounted on said lamp shell and manually adjustable from a position externally of said lamp shell, said potientiometer connected to the printed circuit on said lamp mounting member, the printed circuit connecting said fixed resistance between the common point between the output from said first inverting element and the input to said second inverting element and the common point between said capacitor and the input to said first inverting element;

a first diode mounted on said lamp mounting member and connected to the printed circuit thereon, the printed circuit connecting said first diode between said movable contact on said potentiometer and the common point between the output of said first inverting element and the input of said second inverting element so that current can flow only from said movable contact to the common point between the output of said first inverting element and the input of said second inverting element to discharge said capacitor; and a second diode mounted on said lamp mounting member and connected to the printed circuit thereon, the printed circuit connecting said second diode between said movable contact on said potentiometer and the common point between said capacitor and the input to said first inverting element so that current can flow from said movable contact to the common point between said capacitor and the input to said first inverting element so that said capacitor can be charged.

5. The lightweight portable light of claim 1 further including an astable oscillator for selectively controlling the operation of said switching transistor, said oscillator having a duty cycle with an on portion and an off portion and including adjustment means for simultaneously varying the on portion and the off portion of the duty cycle so that the off portion is increased simultaneously as the on portion is decreased and vice versa.

* * * * *